US012000192B2

(12) United States Patent
Murree

(10) Patent No.: US 12,000,192 B2
(45) Date of Patent: Jun. 4, 2024

(54) SENSOR FOR ANTI-ENTRAPMENT SYSTEM

(71) Applicant: UUSI, LLC, Reed City, MI (US)

(72) Inventor: Stephen Murree, Shelby Township, MI (US)

(73) Assignee: UUSI, LLC, Reed City, MI (US)

( * ) Notice: Subject to any disclaimer, the term of this patent is extended or adjusted under 35 U.S.C. 154(b) by 852 days.

(21) Appl. No.: 17/097,202

(22) Filed: Nov. 13, 2020

(65) Prior Publication Data

US 2021/0148152 A1 May 20, 2021

Related U.S. Application Data

(60) Provisional application No. 62/936,089, filed on Nov. 15, 2019.

(51) Int. Cl.

*E05F 15/44* (2015.01)
*E05F 15/46* (2015.01)
*E05F 15/50* (2015.01)

(52) U.S. Cl.

CPC ............ *E05F 15/443* (2015.01); *E05F 15/46* (2015.01); *E05F 15/50* (2015.01); *E05Y 2201/454* (2013.01); *E05Y 2400/44* (2013.01); *E05Y 2400/54* (2013.01); *E05Y 2600/45* (2013.01); *E05Y 2600/46* (2013.01); *E05Y 2900/531* (2013.01); *E05Y 2900/542* (2013.01); *E05Y 2900/55* (2013.01)

(58) Field of Classification Search

CPC ................................ E05F 15/443; E05F 15/46
See application file for complete search history.

(56) References Cited

U.S. PATENT DOCUMENTS 5,351,442 A * 10/1994 Gingras .................... E06B 1/32
49/411
5,621,290 A * 4/1997 Heller .................. H03K 17/955
318/479
6,243,635 B1 6/2001 Shank et al.
6,337,549 B1 * 1/2002 Bledin .................... E05F 15/46
318/449
6,377,009 B1 * 4/2002 Philipp ................... E05F 15/46
318/266
(Continued)

FOREIGN PATENT DOCUMENTS

CN 204720239 U * 10/2015
CN 109057604 A * 12/2018 ............. E05F 15/47
(Continued)

*Primary Examiner* — Ryan D Walsh
(74) *Attorney, Agent, or Firm* — Howard & Howard Attorneys PLLC

(57) ABSTRACT

A sensor for an anti-entrapment system of a vehicle for preventing an object within an opening of the vehicle defined by a movable panel from being pinched by the movable panel includes a seal adapted to be mounted to a portion of the vehicle, an electrically conductive mounting carrier disposed in the seal and having a formed shape and operable to detect the object in the path of the movable panel and to generate a pinch sensor signal indicative of the object either touching the seal or in close proximity to the seal, and a controller for monitoring the electrically conductive mounting carrier, wherein the controller controls the movable panel to prevent the movable panel from pinching the object in response to the pinch sensor signal.

33 Claims, 2 Drawing Sheets

(56) References Cited

U.S. PATENT DOCUMENTS

| | | | | |
|---|---|---|---|---|
| 6,499,359 | B1 | 12/2002 | Washeleski et al. | |
| 6,700,393 | B2 * | 3/2004 | Haag | E05F 15/46 324/660 |
| 6,782,759 | B2 | 8/2004 | Shank et al. | |
| 6,896,268 | B2 * | 5/2005 | Hofmann | B60J 10/00 277/645 |
| 6,968,746 | B2 | 11/2005 | Shank et al. | |
| 7,132,642 | B2 | 11/2006 | Shank et al. | |
| 7,162,928 | B2 | 1/2007 | Shank et al. | |
| 7,293,467 | B2 | 11/2007 | Shank et al. | |
| 7,319,301 | B2 * | 1/2008 | Pribisic | H03K 17/955 49/27 |
| 7,513,166 | B2 | 4/2009 | Shank et al. | |
| 7,908,927 | B2 | 3/2011 | Washeleski et al. | |
| 8,448,521 | B2 | 5/2013 | Washeleski et al. | |
| 8,854,061 | B2 * | 10/2014 | Suhara | E05F 15/46 49/27 |
| 9,234,979 | B2 * | 1/2016 | Bolbocianu | E05F 15/443 |
| 9,389,062 | B2 | 7/2016 | Washeleski et al. | |
| 2003/0056600 | A1 | 3/2003 | Shank et al. | |
| 2003/0233790 | A1 * | 12/2003 | Nuber | E05F 15/46 49/28 |
| 2005/0016290 | A1 | 1/2005 | Shank et al. | |
| 2005/0041375 | A1 * | 2/2005 | Rosenau | G01D 5/2405 361/524 |
| 2005/0092097 | A1 | 5/2005 | Shank et al. | |
| 2006/0117862 | A1 | 6/2006 | Shank et al. | |
| 2006/0261769 | A1 * | 11/2006 | Rees | A47C 31/00 318/450 |
| 2007/0089527 | A1 | 4/2007 | Shank et al. | |
| 2008/0011093 | A1 | 1/2008 | Shank et al. | |
| 2009/0158857 | A1 | 6/2009 | Shank et al. | |
| 2011/0163764 | A1 | 7/2011 | Shank et al. | |
| 2012/0153972 | A1 * | 6/2012 | Stockschlager | E05F 15/46 324/672 |
| 2013/0263672 | A1 | 10/2013 | Washeleski et al. | |
| 2015/0121758 | A1 * | 5/2015 | Pohl | H03K 17/945 49/506 |
| 2017/0030127 | A1 * | 2/2017 | Elie | E05F 15/77 |
| 2017/0233579 | A1 * | 8/2017 | Yushin | C23C 16/45525 427/212 |

FOREIGN PATENT DOCUMENTS

| | | | | | |
|---|---|---|---|---|---|
| JP | 2831545 | B2 | * | 12/1998 | |
| JP | 3834909 | B2 | * | 10/2006 | B60J 10/00 |
| WO | WO-2007147115 | A2 | * | 12/2007 | E05F 15/46 |

* cited by examiner

SENSOR FOR ANTI-ENTRAPMENT SYSTEM

CROSS-REFERENCE TO RELATED APPLICATION(S)

The present application claims the benefit of and priority to U.S. Ser. No. 62/936,089, filed Nov. 15, 2019, the entire disclosure of which is hereby expressly incorporated by reference.

BACKGROUND OF THE INVENTION

1. Field of the Invention

The present invention relates generally to an anti-entrapment system of a vehicle for preventing entrapment of an object and, more particularly to, an anti-entrapment system of a vehicle provided with a sensor for preventing entrapment of an object.

2. Description of the Related Art

Anti-entrapment systems use various types of sensors to detect pinching of an object such as a human body part. For example, in vehicles such as automotive vehicles, sensors are used for pinch sensing at electrically operated doors, windows, hatches, decks, hoods, lids, and the like.

A pinch sensor detects pinching of an object by a translating device such as a movable window, door, sunroof, etc. In operation, the pinch sensor generates a pinch sensor signal in response to the object such as a person's finger being pinched by the translating device such as a window as the window is closing. In response to the pinch sensor signal, a controller controls the window to reverse direction and open in order to prevent further pinching of the person's finger.

Accordingly, it is desirable to provide a sensor for an anti-entrapment system of a vehicle that detects a translating device pinching an object as soon as the translating device has applied a relatively small amount of pinching to the object and/or detects the presence of an object within an opening which may be closed by the translating device in order to prevent any pinching of the object by the translating device. It is also desirable to provide a sensor for use with existing structures of a vehicle such as a seal. Therefore, there is a need in the art to provide a sensor for an anti-entrapment system for preventing entrapment of an object

SUMMARY OF THE INVENTION

Accordingly, the present invention provides a sensor for an anti-entrapment system of a vehicle for preventing an object within an opening of the vehicle defined by a movable panel from being pinched by the movable panel. The sensor includes a seal adapted to be mounted to a portion of the vehicle, an electrically conductive mounting carrier disposed in the seal and having a formed shape, wherein the electrically conductive mounting carrier is operable to detect the object in the path of the movable panel and to generate a pinch sensor signal indicative of the object either touching the seal or in close proximity to the seal, and a controller for monitoring the electrically conductive mounting carrier, wherein the controller controls the movable panel to prevent the movable panel from pinching the object in response to the pinch sensor signal.

Further, the present invention provides an anti-entrapment system of a vehicle for preventing an object within an opening of the vehicle defined by a movable panel from being pinched by the movable panel. The system includes a motor adapted to move the movable panel for opening and closing the opening and a sensor adapted to be mounted to a portion of a vehicle operable to detect the object in the path of the moving panel and to generate a pinch sensor signal indicative of the object either touching the sensor or in close proximity to the sensor. The sensor includes a seal adapted to be mounted to a portion of the vehicle and an electrically conductive carrier disposed in the seal and having a formed shape. The system also includes a controller for monitoring the sensor, wherein the controller controls the motor to prevent the movable panel from pinching the object in response to the pinch sensor signal.

In addition, the present invention provides a method of sensing for an anti-entrapment system of a vehicle for preventing an object within an opening of the vehicle defined by a movable panel from being pinched by the movable panel. The method includes the steps of producing a sensor including a seal adapted to be mounted to a portion of the vehicle and an electrically conductive mounting carrier disposed in the seal and having a shape, wherein the electrically conductive mounting carrier is operable to detect the object in the path of the movable panel and to generate the pinch sensor signal indicative of the object either touching the seal or in close proximity to the seal. The method includes monitoring by a controller the electrically conductive mounting carrier and controlling the movable panel by the controller to prevent the movable panel from pinching the object in response to the pinch sensor signal.

One advantage of the present invention is that a new sensor is provided for an anti-entrapment system of a vehicle. Another advantage of the present invention is that the sensor uses a portion of an existing seal structure instead of adding a separate sensor strip or sensor strip components into a seal for use as a sensor to simplify construction and save cost. Yet another advantage of the present invention is that the sensor uses a portion of an existing seal structure, thereby eliminating the need to add a sensor strip and modify seal profiles that are already qualified and being produced. Still another advantage of the present invention is that the sensor is able to use the existing structure of a seal as a sensor element providing many benefits, including reduced tooling, structure change, and cost.

These and other objects, advantages, and features of the present invention will become better understood from the following detailed description of one exemplary embodiment of the present invention that is described in conjunction with the accompanying drawings.

DESCRIPTION OF THE PREFERRED EMBODIMENT(S)

Figure 8:
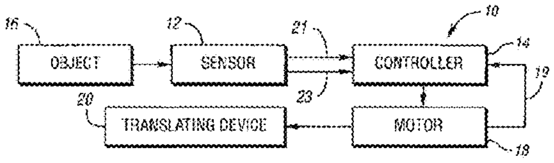
FIG. 8 is a block diagram of an embodiment of an anti-entrapment system constructed according to the present invention for use with the sensor of FIGS. 1-7A.
Figure 9:
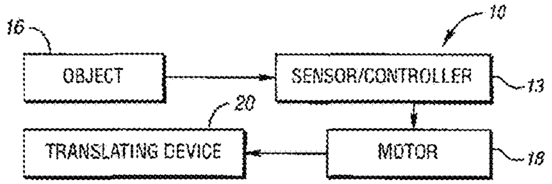
FIG. 9 is a block diagram of another embodiment of an anti-entrapment system constructed according to the present invention illustrating an integrated sensor and controller for use with the sensor of FIGS. 1-7A.

Referring to the drawings, one embodiment of an object sensing or anti-entrapment system 10 for a vehicle (not shown) is shown in FIGS. 8 and 9. The vehicle includes an opening (not shown). The anti-entrapment system 10 includes a sensor 12 and a controller 14 in FIG. 8 and a sensor/controller 13 in FIG. 9. The vehicle includes a translating device 20 such as a movable panel for opening and closing the opening of the vehicle. The translating device 20 may be, for example, a window, door, or sunroof of the vehicle. The sensor 12 is adapted to be mounted to a portion of the vehicle adjacent the opening operable for detecting an object 16 in the path of the translating device 20 and to generate a pinch sensor signal indicative of the object 16 either touching the sensor 12 or in close proximity to the sensor 12. The anti-entrapment system 10 also includes a motor 18 adapted to move the translating device 20 for opening and closing the opening. It should be appreciated that the controller 14 controls the motor 18 to prevent the translating device 20 from pinching the object 16 in response to the pinch sensor signal.

The sensor 12 is generally a capacitance sensor that is operable to detect touching by the object 16 to the sensor and/or the presence (i.e., proximity) of the object 16 near the sensor 12. In response to the object 16, including human body parts, touching the sensor 12, the capacitance of the sensor 12 changes. Likewise, in response to an electrically conductive object 16, including human body parts, coming within the proximity of the sensor 12, the capacitance of the sensor 12 changes even without the object 16 actually touching, or applying any force, to the sensor 12. This provides for zero force detection of a human body part before contact to the sensor 12 is made by the body part. As such, the sensor 12 is a contact (i.e., touch) and a non-contact (i.e., proximity) sensor.

The controller 14 can have switch inputs, communications capability with other sensors and controllers, and various outputs for controlling and monitoring various aspect of the translating device 20. For instance, the controller 14 can have sensor inputs for the motor 18 as designated by line 19 in FIG. 8 or other moving members, such as a door, to determine the position, direction of movement, speed of movement, etc. of the translating device 20. It should be appreciated that such sensor inputs could be for receiving signals from Hall Effect sensors and the like as well as optic, resistive, and inductive sensors.

In the case of the controller 14 receiving the sensor signals 19 responsive to the motor 18 or other moving members, the controller 14 would have additional anti-entrapment capabilities by making use of motor current and/or commutator pulses and/or sensor signals from Hall (or other type) sensors. This would have the added benefit of being able to detect obstructions while the moving member and the obstruction are too far away from the sensor 12 to be sensed by the sensor 12. It should be appreciated that such a controller 14 is disclosed in U.S. Pat. No. 7,513,166 to Shank et al., the entire disclosure of which is hereby expressly incorporated by reference.

Referring to FIGS. 6 and 6A and FIGS. 7 and 7A, two different embodiments of a sensor 396 and 405, respectively, are used to detect the presence of the object 16. In FIGS. 6 and 6A and FIGS. 7 and 7A, these types of sensor 396 and 405 are manufactured by co-extruding elements together to form a profile that is desired for various applications. The basic elements of each sensor 396 and 405 are a sensor jacket 400 and 406, wire sensing element 397, 398, and 409, metallic strip sensing element 407, dielectric 399, air gaps 403, 404, 410, and 411, and conductive elastomer 401, 402, and 408.

Figure 6A:
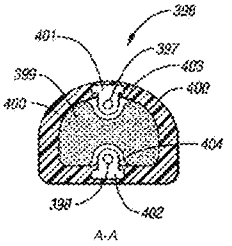
FIG. 6A is a sectional view taken along line A-A of FIG. 6.
Figure 6:
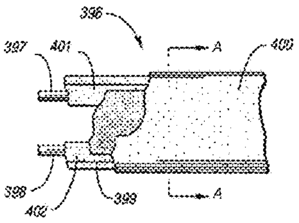
FIG. 6 is a side view of an embodiment of a capacitive sensor for use in an anti-entrapment system constructed according to the present invention illustrating a sensor strip.

Referring now to FIGS. 6 and 6A, the sensor 396 includes the first and second wire sensing elements 397 and 398. The sensor jacket 400 has a hollow interior encases the first wire sensing element 397 and holds each end of the first conductive elastomer 401 and encases the second wire sensing element 398 and holds each end of the second conductive elastomer 402. The conductive elastomers 401 and 402 divide the interior of the sensor jacket 406 into two air gaps 403 and 404. The air gaps 403 and 404 are filled with air or other dielectric 399. The sensor 396 registers a change in capacitance whenever the distance between the first and second wire sensing elements 397 and 398 changes as a result of the object 16 touching the sensor jacket 400 and/or as a result of an electrically conductive object coming into proximity with either of the wire sensing elements 397 and 398.

Figure 7A:
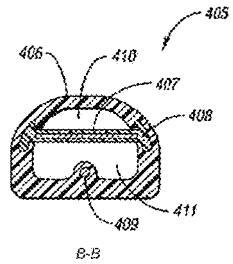
FIG. 7A is a sectional view taken along line B-B of FIG. 7.
Figure 7:
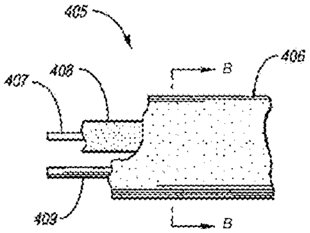
FIG. 7 is a side view of another embodiment of a capacitive sensor for use in an anti-entrapment system constructed according to the present invention illustrating a sensor strip.

Referring now to FIGS. 7 and 7A, the sensor 405 is a combination proximity/displacement sensor with an internal fabric conductive element that can also be used as a heating element and temperature sensor. When pressure is applied to the sensor jacket 406, the air gaps 410 and 411 compress to move the sensor jacket 406 toward the strip sensing element 407 which is sheathed inside the conductive elastomer 408. To this end, the air gaps 410 and 411 can be air, foam, or any dielectric material formulated to allow for low force.

The wire sensing element 409 is used to make an electrical connection for the sensor jacket 406. The sensor 405 registers a change in capacitance whenever the distance between the strip sensing element 407 and the sensor jacket 406 changes as a result of the object 16 touching the sensor jacket 406 and/or as a result of an electrically conductive object coming into proximity with the sensor jacket 406. It should be appreciated that the change in capacitance is signaled to the controller 14.

The strip sensing element 407 may be used as a heating element when the anti-pinch strip system is inactive. The heating element function can be used to heat the sensor 405, which may be used as a weather seal, keeping the conductive elastomer 408 and air gaps 410 and 411 pliable in cold weather conditions. It is a goal to have the weather seal properties maintained to application compliance standards while heated. Additionally, the heated weather seal could be used to prevent the window or sliding panel from freezing and/or to aid in thawing a frozen window or sliding panel while in the closed position. The strip sensing element 407 would be engaged as a heating element when powered by relays turned on by the controller 14 with inputs from a temperature sensor, which could be from the vehicle outside temperature sensor. It should be appreciated that the temperature input could also originate from a separate temperature sensor located on a device inside the vehicle door, or anywhere else outside the vehicle.

The temperature setting to turn on the strip sensing element 407 is optional, but would likely be set for temperatures at or below 40 degrees Fahrenheit. where cold weather pliability is required. When the set temperature is reached, the controller 14 will turn the strip sensing element 407 on to make the weather seal pliable. The circuit in the controller 14 can also be configured to automatically cycle the strip sensing element 407 on and off after the desired pliability is achieved to thereafter maintain pliability.

By using relays or transistors, the strip sensing element 407 can be powered such that an appropriate amount of current flows through the element. The current flow through the resistive element will produce the required amount of heat following the well-known equation Power (Watts) =Current $(A)^2$ times Resistance (Ohms). The power can be applied for a given amount of time and then removed. During the time power is removed, the strip sensing element 407 can be connected to a circuit that provides a small amount of current flow through the element and through a series connected resistor.

The strip sensing element 407 and the series connected resistor form a voltage divider. The voltage that is developed can then be interpreted by a microprocessor, or other device such as an op-amp, to determine the temperature of the strip sensing element 407. If the temperature is below a determined set-point, the strip sensing element 407 can again be connected such that power is applied to it increasing the amount of heat generated. After the temperature sensor determines that the temperature is above the set point, the controller 14 will turn off the relays or transistors providing power to the strip sensing element 407.

In another embodiment, the controller 14 can be configured to inhibit a user input command to open a window or sliding panel when, anytime during the time of heating the strip sensing element 407, no window or panel movement is sensed, indicating a stalled motor condition such as may be caused by ice buildup in the weather seal. During such an event, the controller 14 continues to inhibit user commands to open the window or sliding panel until the strip sensing element 407 inside the weather seal has achieved a temperature sufficient to free the window or sliding panel. The controller 14 could be configured to recognize the above condition from temperature sensor inputs at all times, including when vehicle ignition and/or other vehicle power is off. It should be appreciated that implementation of this function could reduce warranty costs related to the window or sliding panel drive mechanism, seals, and motor.

In another embodiment, the strip sensing element 407 could be used as a heating element inside a weather seal not using an anti-pinch strip system. In this case, the controller 14 is configured to only control the heating element function as described above. It should also be appreciated that the controlling function could also be integrated as part of other electronics being employed within the application system.

In yet another embodiment, the strip sensing element 407 could be used as a temperature sensor, either as a stand-alone sensor, or in combination with the anti-pinch system. The function to switch between temperature sensing and anti-pinch sensing would be configured through the controller 14. The temperature sensing function of the strip sensing element 407 could be used to provide the same temperature inputs required to operate the anti-pinch system as described above.

Figure 5:
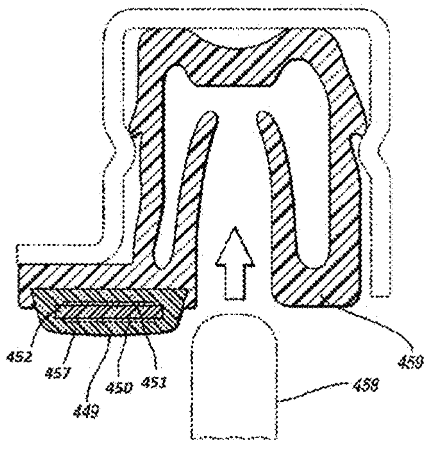
FIG. 5 is a cross-sectional view of an embodiment of a capacitive sensor for use in an anti-entrapment system constructed according to an embodiment of the present invention illustrating a seal.
Figure 5A:
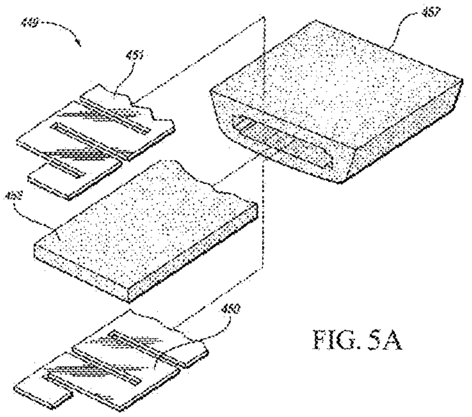
FIG. 5A is an exploded perspective view of the capacitive sensor of FIG. 5.

While the aforementioned sensors 396 and 405 can be used by themselves, it is sometimes advantageous or necessary to add them to, or incorporate them into, a seal 459, as shown in FIGS. 5 and 5A. As an example, a sensor 449 illustrated in FIG. 5A is incorporated into the seal 459 in FIG. 5. To manufacture this seal 459, a recessed area is added to the seal 459 to accept the sensor 449. In this embodiment, the sensor 449 includes sensor elements 450 and 451 and dielectric structure 452 being co-extruded inside a sensor jacket 457. The sensor 449 is then attached to the seal 459 by a suitable mechanism such as an adhesive or by other means. It should be appreciated that this assembly or sensor is then used with the translating device 20 such as window glass 458 commonly used in the automotive industry for the opening in the vehicle.

As shown in FIG. 5, the sensor elements 450, 451 of the sensor 449 are constructed in a serpentine pattern with spaced slots. This configuration provides flexibility for conforming the sensor 449 to shapes that would apply a load perpendicularly to the flat planar surface of the sensor elements 450, 451 in certain applications. The spaced slots are preferably 0.5 mm wide and 5 mm in length, spaced 2.5 mm apart along the entire length of the sensor elements 450, 451. It should be appreciated that other slot sizes, spacings, and patterns could be used to accomplish the same flexibility purpose specific to a given application of the sensor 449. It should also be appreciated that, by increasing the widths of the sensor elements 450, 451, a larger overall sensor can be created to allow for a greater surface area of entrapment protection.

The sensor 449 is sized for a typical automobile door window seal application, and has a minimum profile designed to not reduce viewing through the window opening. As shown in FIG. 5, the sensor 449 is attached to a weather seal 459. The weather seal 459 is attached to an automobile window frame 460. The frame 460 and the weather seal 459 have an opening for receiving an automobile window 458 when the window is in a fully closed position.

If a non-compressible material is used, then the sensor 449 provides proximity sensing only operation. If compressible material is used, then the sensor 449 provides both pinch and proximity sensing operations. A preferred material for dielectric medium 452 of the sensor 449 is an electrically non-conductive flexible polyurethane foam, such as Rogers Corporation Poron 4701-30-20062-04. Other foam materials, such as EPDM, thermoplastic rubber, thermoplastic elastomer, or TPV could also be used for dielectric medium 452. These materials are currently used in window seals to meet the appearance and reliability requirements for window closures. Santoprene, a thermoplastic elastomer material made by Advanced Elastomer Systems, maintains stable compression characteristics over temperature, whereas EPDM compression characteristics decrease as temperature is reduced.

Stiff compression characteristics increase pinch forces. A material, which maintains flexibility and compression characteristics when cold, is preferred for pinch operation of the sensor 449. The material for dielectric medium 452 could be introduced by co-extrusion as any of the materials mentioned, or made by foaming the sensor jacket 457 in the dielectric space between the sensor elements 450, 451. It should be appreciated that a foamed space would be made up of the material of the sensor jacket 457 and air as the dielectric.

A preferred material of the sensor jacket 457 is a non-electrically conductive thermoplastic rubber or elastomer material, such as Santoprene. The surface resistivity of the sensor jacket 457 and dielectric medium 452 is to be set greater than 10.sup.6 ohm/cm to avoid electrical shorting potential between the sensor elements 450, 451. The thickness of the material of the sensor jacket 457 between the sensor element 450 and the sensing surface of the sensor jacket 457 contains the optimal sensor jacket material thickness required to (a) completely enclose the sensor elements 450, 451 and dielectric medium 452 (i.e., completely enclose the sensor 449) with the sensor jacket 457 to prevent moisture infiltration; (b) reduce the possibility of voids; and (c) keep the dimension between the sensor elements 450, 451 at a useful spacing to provide useful proximity mode detection and sensitivity.

Figure 1:
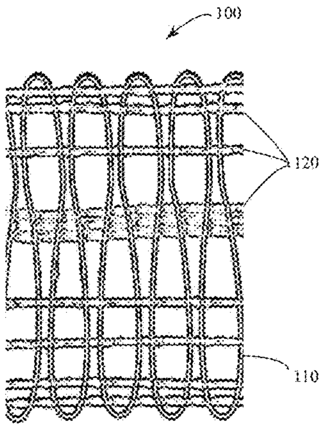
FIG. 1 is a plan view of a wire woven carrier used in an embodiment of a sensor for use in an anti-entrapment system constructed according to the present invention.
Figure 3:
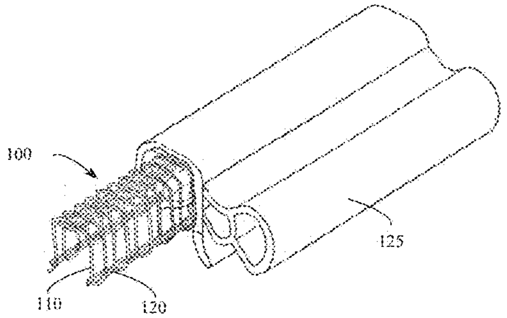
FIG. 3 is a perspective view of an embodiment of a sensor for use in an anti-entrapment system constructed according to the present invention illustrating the wire woven carrier of FIG. 1 that has been formed and co-extruded into a seal.

Referring to FIG. 1, an electrically conductive mounting carrier 100 is comprised of wire 110 that is bent into a serpentine shape where bend spacing is between approximately three (3) millimeters (mm) and approximately ten (10) mm between serpentine bends. The wire 110 may be made of cold drawn steel, aluminum, or other suitable metal. The wire 110 may include filaments 120 woven or sewn into the serpentine shaped wire, typically polyester and polypropylene, to aid in the positioning, bonding, and stability of the wire 110 in the seal 459. The carrier 100 is bent into a 'U' shape and co-extruded into a weather seal 125 resulting in a construction illustrated in FIG. 3. It should be appreciated that, in seals, particularly automotive weather seals, the metallic structures internal to the seal allow for attaching the seal to a surface of the vehicle.

Figure 2:
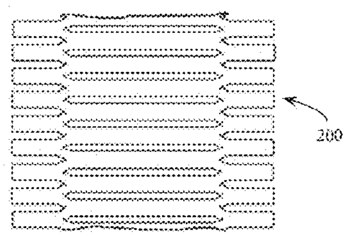
FIG. 2 is a plan view of a lanced metal strip used in an embodiment of a sensor for use in an anti-entrapment system according to the present invention.
Figure 4:
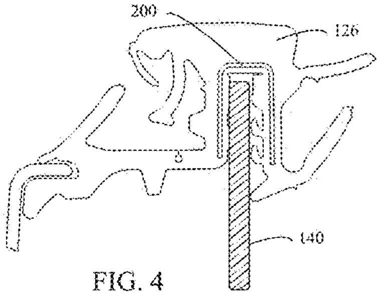
FIG. 4 is a cross-sectional view of an embodiment of a sensor for use in an anti-entrapment system constructed according to the present invention illustrating a seal with the wire woven carrier of FIG. 1 in position.

Another embodiment of an electrically conductive mounting carrier 200 is shown in FIG. 2. The carrier 200 is a metal strip. The strip may be made of steel, aluminum, or other suitable metal. The strip may be lanced or slit. In one embodiment, the strip of the carrier 200 is of a lance and stretch type and formed and co-extruded into a seal profile. In FIG. 4, a cross-sectional view of a sensor including a seal 126 with the carrier 200 is shown in position surrounding a mounting surface 140 of the vehicle. It should be appreciated that the carriers 100 and 200, as well as other carrier configurations, can be formed into a 'U' shape or any other desired shape including flat or planar, and that carrier strips can be used with a seal and produced by co-extrusion, layering of materials, adhesive bonding, or any other advantageous method. It should be appreciated that the carrier 100 and 200 may made be of a metal material or any other conductive material such as a conductive plastic. It should also be appreciated that the carrier 100 and 200 may be in the form of a continuous non-apertured channel or may be slotted or have slits or otherwise apertured to increase its flexibility.

Referring now to FIG. 8, one embodiment of the anti-entrapment system 10 in accordance with the present invention is shown. As illustrated, the anti-entrapment system 10 includes the sensor 12 and the controller 14. The sensor 12 may be a contact (i.e., touch) and a non-contact (i.e., proximity) type sensor. In one embodiment, the sensor 12 is generally a capacitance sensor that is operable to detect touching of, or proximity to, the electrically conductive object 16 where the electrically conductive mounting carrier 100 or 200 is driven with an electrical charge from the controller 14. In response to the electrically conductive object 16, including human body parts, touching the sensor 12, the capacitance of the sensor 12 changes. Likewise, in response to the electrically conductive object 16, including human body parts, coming within proximity of the sensor 12, the capacitance of the sensor 12 changes. It should be appreciated that proximity sensing provides for zero force detection of a human body part before contact to the sensor 12 is made.

Referring again to FIG. 8, the controller 14 controls the motor 18 associated with the translating device 20 such as a movable panel, for example, a window, door, sunroof, etc. in order to move the translating device 20 between opened and closed positions. Using a window as an example of the translating device 20, the controller 14 controls the motor 18 to move the window as the translating device 20 in an opening direction when opening the opening of the window as the translating device 20 is desired. Similarly, the controller 14 controls motor 18 to move the window as the translating device 20 in a closing direction in order to close off the opening when closing of the opening is desired. It should be appreciated that the motor 18 may also send signals 19 to the controller 14 to aid in operation. It should further be appreciated that the device used to move a translating panel, such as the motor 18, may instead be a pneumatic device such as an air cylinder with a position sensor being used to provide position signals 19.

In operation, generally, an operator (not shown) actuates a switch (not shown) to have the controller 14 control the opening and closing of the window as the translating device 20. Such a switch may be configured to provide express-up (i.e., express close) and express-down (i.e., express open) functionality such that a single switch actuation (as opposed to a continuous actuation) causes the controller 14 to control the window as the translating device 20 until the window as the translating device 20 has fully moved into its opened or closed position.

The sensor 12 is placed adjacent to the opening such that the object 16 touches the sensor 12 and/or becomes in close proximity to the sensor 12 if the object 16 is caught between the opening and the window as the translating device 20 and is about to be pinched by the window as the translating device 20. The sensor 12 generates a pinch sensor signal 21 in response to the object 16 touching the sensor 12 and generates a proximity sensor signal 23 in response to the object 16 being in close proximity to the sensor 12. The sensor 12 provides pinch and proximity sensor signals 21, 23 to the controller 14. In response to receiving pinch and/or proximity sensor signals, the controller 14 controls the window as the translating device 20 via the motor 18 accordingly.

For instance, if the operator has actuated the switch to have the controller 14 close the window as the translating device 20 and the window as the translating device 20 is now closing (for example, when the window is in express-up operation), the controller 14 controls the window as the translating device 20 to stop closing and then open in response to a detection by the sensor 12 of the object 16 within the opening or path of the translating device 20. Reversing the direction of the window as the translating device 20 and opening the window as the translating device 20 causes the opening to increase in size in order to prevent any pinching of the object 16 and to give time for the object 16 to be removed from the opening. Similarly, if the sensor 12 detects the presence of the object 16 within window opening or path of the translating device 20, the controller 14 prevents the window as the translating device 20 from subsequently moving in the closing direction until the object 16 has been removed from the opening or path of the translating device 20.

Referring now to FIG. 9, in another embodiment, the sensor 12 and controller 14 may be integrated with one another to form the sensor/controller 13. The sensor/controller 13 effectively provides the same function as the non-integrated sensor 12 and controller 14. It should be appreciated that the description regarding the sensor 12 and the controller 14 also refers to the sensor and controller functionality provided by the sensor/controller 13.

In operation, the sensor 12 of FIG. 8 and the sensor portion of the sensor/controller 13 of FIG. 9 are electrically connected to the controller 14 and sensor/controller 13, respectively, and energized such that a generated signal can be used to determine if a human or other electrically conductive object is in close proximity to the sensor 12. It should be appreciated that using the carrier 100 of FIG. 3 and the carrier 200 of FIG. 4, instead of adding a sensor strip, simplifies the construction and assembly of the sensor 12.

In order for the internal carriers 100 and 200 to be used as sensing element, the carriers 100 and 200 are isolated from other metal or electrically conductive features such as metal mounting flange 140 of the vehicle as illustrated in FIG. 4. It should be appreciated that the mounting flange 140 is typically part of a vehicle body structure of the vehicle and, as such, is typically connected to vehicle electrical ground. It should also be appreciated that the carriers 100 and 200 are isolated from the mounting flange 140 by use of an insulator such as a high resistivity isolation material such as a non-conductive rubber and/or thermoplastic to prevent the carrier 100 or 200 from shorting to a metal portion of the vehicle.

The present invention also provides a method of sensing for the anti-entrapment system 10 of a vehicle for preventing the object 16 within the opening of the vehicle defined by the translating device 20 from being pinched by the translating device 20. The method includes the steps of producing a sensor 12 comprising a seal 459 adapted to be mounted to a portion of the vehicle and an electrically conductive mounting carrier 100, 200 disposed in the seal 459 and having a "U" shape operable to detect the object 16 in the path of the translating device 20 and to generate a pinch sensor signal indicative of the object 16 either touching the seal 459 or in close proximity to the seal 459. The method also includes the steps of monitoring by the controller 14 the electrically conductive mounting carrier 100, 200 and controlling the translating device 20 by the controller 14 to prevent the translating device 20 from pinching the object 16 in response to the pinch sensor signal. The method includes the steps of producing the sensor 12 includes coextruding the seal 459 and the carrier 100, 200, energizing the carrier 100, 200 by the controller 14, and sensing a change in pinch sensor signal based on proximity of the object 16 to the carrier 100, 200. It should be appreciated that the above method also applies to the sensor/controller 13.

The present invention has been described in an illustrative manner. It is to be understood that the terminology, which has been used, is intended to be in the nature of words of description rather than of limitation.

Many modifications and variations of the present invention are possible in light of the above teachings. Therefore, the present invention may be practiced other than as specifically described.

What is claimed is:

1. A sensor for an anti-entrapment system of a vehicle for preventing an object within an opening of the vehicle defined by a movable panel from being pinched by the movable panel, the sensor comprising:

a seal adapted to be mounted to a portion of the vehicle;

an electrically conductive mounting carrier disposed in the seal and having a formed "U" shape with two parallel sides adapted to surround a portion of the movable panel when the portion of the movable panel is disposed between the sides of the electrically conductive mounting carrier, wherein the electrically conductive mounting carrier is operable to detect the object in the path of the movable panel and to generate a pinch sensor signal indicative of the object either one of touching the seal and in close proximity to the seal; and a controller for monitoring the electrically conductive mounting carrier, wherein the controller controls the movable panel to prevent the movable panel from pinching the object in response to the pinch sensor signal.

2. The sensor of claim 1 wherein the sensor is a capacitive sensor configured to be activated by the object while the electrically conductive mounting carrier is being driven with an electrical charge from the controller.

3. The sensor of claim 1 wherein the seal is adapted to be disposed generally adjacent to the opening for the movable panel.

4. The sensor of claim 3 wherein the movable panel is a window of the vehicle.

5. The sensor of claim 3 wherein the movable panel is a door of the vehicle.

6. The sensor of claim 3 wherein the movable panel is a sunroof of the vehicle.

7. The sensor of claim 1 wherein the carrier is a wire.

8. The sensor of claim 7 wherein the wire is made of steel.

9. The sensor of claim 7 wherein the wire is made of aluminum.

10. The sensor of claim 7 wherein the wire is made into a serpentine shape.

11. The sensor of claim 7 wherein the wire is made into a serpentine shape with 3 mm to 10 mm spacing between serpentine bends.

12. The sensor of claim 7 wherein the wire is made with filaments of woven/sewn fibers.

13. The sensor of claim 12 wherein the fibers are made of polyester.

14. The sensor of claim 12 wherein the fibers are made of polypropylene.

15. The sensor of claim 1 wherein the carrier is a metal strip.

16. The sensor of claim 15 wherein the strip is made of steel.

17. The sensor of claim 15 wherein the strip is made of aluminum.

18. The sensor of claim 15 wherein the strip is lanced.

19. The sensor of claim 15 wherein the strip is slit.

20. The sensor of claim 1 wherein the carrier is made of a conductive plastic.

21. The sensor of claim 1 including an insulator adapted to prevent the carrier from shorting to a metal portion of the vehicle.

22. The sensor of claim 21 wherein the insulator is made of a non-conductive rubber.

23. The sensor of claim 21 wherein the insulator is made of a non-conductive thermoplastic.

24. A sensor for an anti-entrapment system of a vehicle for preventing an object within an opening of the vehicle defined by one of a window and sunroof from being pinched by the one of the window and sunroof, the sensor comprising:

a seal adapted to be mounted to a portion of the vehicle;

an electrically conductive carrier disposed in the seal and having a formed "U" shape with two parallel sides adapted to surround a portion of the one of the window and sunroof when the portion of the one of the window and sunroof is disposed between the sides of the electrically conductive mounting carrier, wherein the electrically conductive carrier is operable to detect the object in the path of the one of the window and sunroof and to generate a pinch sensor signal indicative of the object either one of touching the seal and in close proximity to the seal; and a controller for monitoring the electrically conductive carrier, wherein the controller controls the one of the window and sunroof to prevent the one of the window and sunroof from pinching the object in response to the pinch sensor signal.

25. A sensor for an anti-entrapment system of a vehicle for preventing an object within an opening of the vehicle defined by a translating door from being pinched by the translating door, the sensor comprising:

a seal;

an electrically conductive "U" shaped mounting carrier with two parallel sides adapted to surround a portion of the translating door when the portion of the translating door is disposed between the sides of the electrically conductive U shaped mounting carrier coextruded into the seal and adapted to be mounted to a leading edge of the translating door, wherein the electrically conductive U shaped mounting carrier is operable to detect the object in the path of the translating door and to generate a pinch sensor signal indicative of the object either one of touching the seal and in close proximity to the seal; and a controller for monitoring the electrically conductive U shaped mounting carrier, wherein the controller controls the translating door to prevent the translating door from pinching the object in response to the pinch sensor signal.

26. An anti-entrapment system of a vehicle for preventing an object within an opening of the vehicle defined by a movable panel from being pinched by the movable panel, the system comprising:

a motor adapted to move the movable panel for opening and closing the opening;

a sensor adapted to be mounted to a portion of a vehicle operable to detect the object in the path of the moving panel and to generate a pinch sensor signal indicative of the object either one of touching the sensor and in close proximity to the sensor, wherein the sensor comprises a seal adapted to be mounted to a portion of the vehicle and an electrically conductive mounting carrier disposed in the seal and having a formed "U" shape with two parallel sides adapted to surround a portion of the movable panel when the portion of the movable panel is disposed between the sides of the electrically conductive mounting carrier; and a controller for monitoring the sensor, wherein the controller controls the motor to prevent the movable panel from pinching the object in response to the pinch sensor signal.

27. The anti-entrapment system of claim 26 wherein the sensor and controller are integrated with one another to form a sensor/controller.

28. An anti-entrapment system of a vehicle for preventing an object within an opening of the vehicle defined by a movable panel from being pinched by the movable panel, the system comprising:

a pneumatic cylinder adapted to move the movable panel for opening and closing the opening;

a sensor adapted to be mounted to a portion of a vehicle operable to detect the object in the path of the moving panel and to generate a pinch sensor signal indicative of the object either one of touching the sensor and in close proximity to the sensor, wherein the sensor comprises a seal adapted to be mounted to a portion of the vehicle and an electrically conductive mounting carrier disposed in the seal and having a formed "U" shape with two parallel sides adapted to surround a portion of the movable panel when the portion of the movable panel is disposed between the sides of the electrically conductive mounting carrier; and a controller for monitoring the sensor, wherein the controller controls the pneumatic cylinder based on position sensor signals to prevent the movable panel from pinching the object in response to the pinch sensor signal.

29. A method of sensing for an anti-entrapment system of a vehicle for preventing an object within an opening of the vehicle defined by a movable panel from being pinched by the movable panel, the method comprising the steps of:

producing a sensor comprising a seal adapted to be mounted to a portion of the vehicle and an electrically conductive mounting carrier disposed in the seal and having a formed "U" shape with two parallel sides adapted to surround a portion of the movable panel when the portion of the movable panel is disposed between the sides of the electrically conductive mounting carrier, wherein the electrically conductive mounting carrier is operable to detect the object in the path of the movable panel and to generate the pinch sensor signal indicative of the object either one of touching the seal and in close proximity to the seal; and monitoring by a controller the electrically conductive mounting carrier and controlling the movable panel by the controller to prevent the movable panel from pinching the object in response to the pinch sensor signal.

30. The method of claim 29 wherein the step of producing the sensor includes coextruding the seal and the carrier.

31. The method of claim 29 including the step of energizing the carrier by the controller.

32. The method of claim 29 including the step of sensing a change in the pinch sensor signal based on proximity of the object to the carrier.

33. A method of sensing for an anti-entrapment system of a vehicle for preventing an object within an opening of the vehicle defined by a movable door from being pinched by the movable door, the method comprising the steps of:

placing a capacitive sensor adapted to be mounted to the movable door of the vehicle comprising a seal and an electrically conductive mounting carrier disposed in the seal and having a formed "U" shape with two parallel sides adapted to surround a portion of the movable door when the portion of the movable door is disposed between the sides of the electrically conductive mounting carrier, wherein the electrically conductive mounting carrier is operable to detect the object in the path of the door and to generate the pinch sensor signal indicative of the object either one of touching the seal and in close proximity to the seal;

placing a first sensor adapted to be mounted to a portion of the vehicle to sense at least one of a speed of the door and direction of movement of the door; and monitoring, by a controller, the capacitive sensor and the first sensor, and controlling the door by the controller to prevent the door from pinching the object in response to the pinch sensor signal.

* * * * *